UNITED STATES PATENT OFFICE.

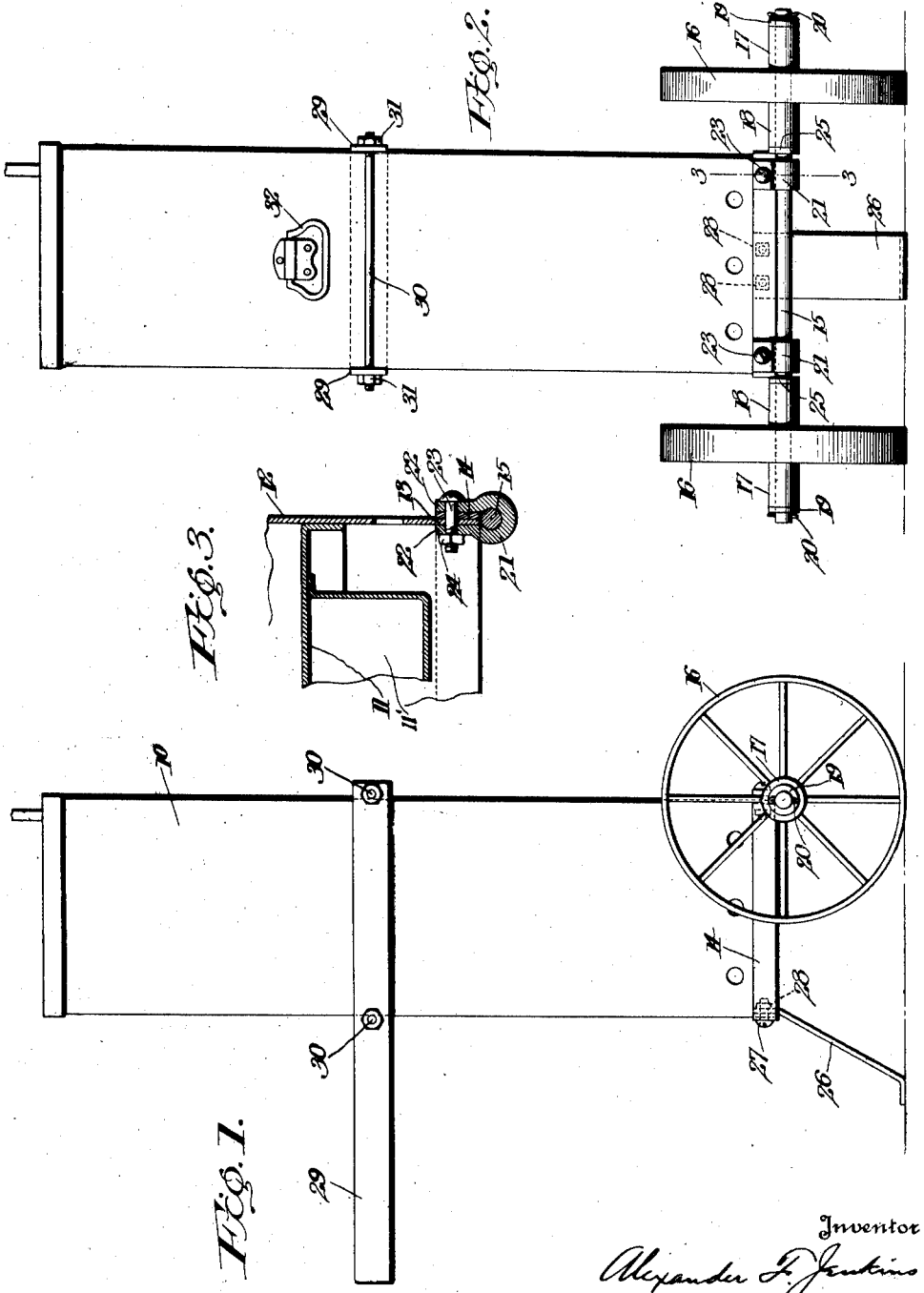

ALEXANDER F. JENKINS, OF BALTIMORE, MARYLAND.

TRUCK FOR PORTABLE LIGHTS.

1,341,235.  Specification of Letters Patent.  Patented May 25, 1920.

Application filed January 30, 1918. Serial No. 214,520.

*To all whom it may concern:*

Be it known that I, ALEXANDER F. JENKINS, a citizen of the United States, and residing at Baltimore, State of Maryland, have invented certain new and useful Improvements in Trucks for Portable Lights, of which the following is a specification.

The present invention relates to trucks for portable lights and more particularly to lights including a tank for carrying the illuminant such as a hydro-carbon oil or for generating a gas such as acetylene.

The invention consists broadly in the provision of a two-wheeled truck and means for removably securing the same to the tank of the light. The features of novelty and objects of the invention will be apparent from the description taken in connection with the drawings; in which Figure 1 is a side elevation of a light tank supported on a two-wheeled truck and having a handle adjustably clamped to the tank for the purpose of moving the apparatus.

Fig. 2 is an end elevation of the parts shown in Fig. 1; and

Fig. 3 is a sectional view of a detail taken substantially on the line 3—3 of Fig. 2.

Referring to the drawings, the invention is shown in connection with a rectangular tank for an acetylene light of the type described in my Patent No. 956,358 granted April 26, 1910, although the same is not limited to this type of tank. As shown, the tank 10 may have a bottom head 11 which is spaced from the bottom edges of the shell 12 thereof, said bottom having a well 11' secured thereto. The portion of the shell projecting below the bottom head 11 therefore constitutes a flange or rim and is designated by the reference numeral 13. This rim at its lower end is reinforced by a band or hoop 14.

The truck for supporting the tank comprises the axle member 15 and the two wheels 16. These wheels are formed with the elongated hubs 17 and 18 and are prevented from longitudinal movement in the direction of the ends of the axle by the washers 19 and cotter pins 20. This truck is adapted to have its axle removably secured to the flange 13 and band 14 of one side of the tank by means such as the bearing clips 21. As shown in Fig. 3, these clips are substantially U-shaped and the curved portion thereof is adapted to fit the axle and form a bearing for the same. The arms 22 of the clip are spaced apart a distance to straddle the rim 13 and band 14. As shown, the diameter of the axle and therefore of the curved bearing portion of the clip is slightly greater than the combined thickness of the rim 13 and band 14, although the invention is not limited to these proportions. The clips are removably secured to the lower edge portion of one side of the tank by means of the bolts 23 and nuts 24, which extend through the arms of the clips and the said lower portion of the side of the tank. A washer 25 is interposed between the hub 18 of each wheel and the adjacent side of the tank thereby preventing inward longitudinal movement of the wheels.

As the truck is secured to one edge of the tank it is necessary to provide means so that it may be stably left in an upright position. For this purpose a foot member 26 is secured to the rim of the tank at the side opposite the one having the truck by means such as the bolts and nuts 27 and 28. A U-shaped handle has its arms 29 spaced a distance equal to the width of the tank and is adapted to be adjustably clamped thereto by the rods 30 having the nuts 31 on the threaded ends thereof.

This manner of attaching the handle makes it possible to employ one which projects far enough from the tank so that it may be wheeled around with the greatest ease, and at the same time is rigid with the tank so that the foot may be raised from the ground merely by tilting the handle and tank about the axle of the truck. Furthermore as the large handle is merely clamped to the tank, it may be adjusted to the height most convenient for the operator. The usual small handles 32 may be provided for lifting the tank.

From the foregoing description it will be seen that the tank may be readily and quickly mounted on the truck merely by securing the bearing clips 21 to the rim at one side of the tank by means of bolts and nuts 23 and 24. Then the foot 26 may be secured to the opposite side of the rim by the bolts and nuts 27 and 28. The removable handle is then clamped to the tank by the rods and nuts 30 and 31. When the contents of the tank are used up, if it is desired to substitute another tank the handle, foot and truck may be removed and a fresh tank placed on the truck in the manner described.

It will be seen, according to this invention, the tank is supported by a truck which is exceedingly simple and has practically only an axle and the wheels. This truck can, therefore, be manufactured at a very small cost. Furthermore, the wheels do not need to be of a large diameter and this fact also is a factor which reduces the cost of the truck.

Although a specific embodiment of the invention has been described, it is to be understood that the details thereof may be varied within the scope of the appended claims without departing from the spirit of the invention.

Having thus described my invention what is claimed as new and desired to be secured by Letters Patent is:

1. In combination, a portable-light tank having a rim at the bottom thereof, a two wheel truck and means for removably mounting the tank on the axle of the truck including a U shaped bearing clip the curved portion of which fits the axle and the arms straddle the rim, and a bolt for securing the arms to the flange.

2. In combination, a portable-light tank having a rim at the bottom thereof, a two wheel truck and means for removably mounting the tank on the axle of the truck including a bearing clip rotatively mounted on the axle and means for detachably fastening said clip to the rim.

3. In combination, a portable-light tank having a rim at the bottom thereof, a two wheel truck, means for removably securing said truck to said rim at one side of the tank, a foot removably secured to said rim at the opposite side of the tank, and a handle removably clamped to the tank.

4. In combination, a portable-light tank having a rim at the bottom thereof, a truck, and means for removably mounting the tank on the truck including a U-shaped bearing clip rotatively mounted on an axle of the truck, the arms of the clip being spaced to straddle the rim and means for securing the arms to the rim.

5. In combination, a rectangular tank for a portable light and a removable handle therefor, said handle being U-shaped the arms thereof adapted to engage opposite sides of the tank and means for clamping said arms on the tank comprising two bolts connecting said arms and each being in longitudinal contact with one of the other sides of said tank.

In testimony whereof I affix my signature.

ALEXANDER F. JENKINS.